A. M. LAYCOCK.
BRAKE MECHANISM.
APPLICATION FILED DEC. 24, 1915.

1,282,245.

Patented Oct. 22, 1918.
2 SHEETS—SHEET 2.

Witnesses
G. T. Baker
H. P. Jennings

Inventor
Arthur M. Laycock
by Foster, Freeman, Watson & Coit
Attorneys

UNITED STATES PATENT OFFICE.

ARTHUR M. LAYCOCK, OF KINGSTON, PENNSYLVANIA.

BRAKE MECHANISM.

1,282,245. Specification of Letters Patent. Patented Oct. 22, 1918.

Application filed December 24, 1915. Serial No. 68,537.

*To all whom it may concern:*

Be it known that I, ARTHUR M. LAYCOCK, a subject of the King of Great Britain, residing at Kingston, Luzerne county, State of Pennsylvania, have invented certain new and useful Improvements in Brake Mechanisms, of which the following is a specification.

This invention relates to brake mechanisms for motor vehicles and has for its objects the provision of an improved form of brake which will be highly efficient in its braking action and which will be simple in construction and easily operated.

Figure 1:
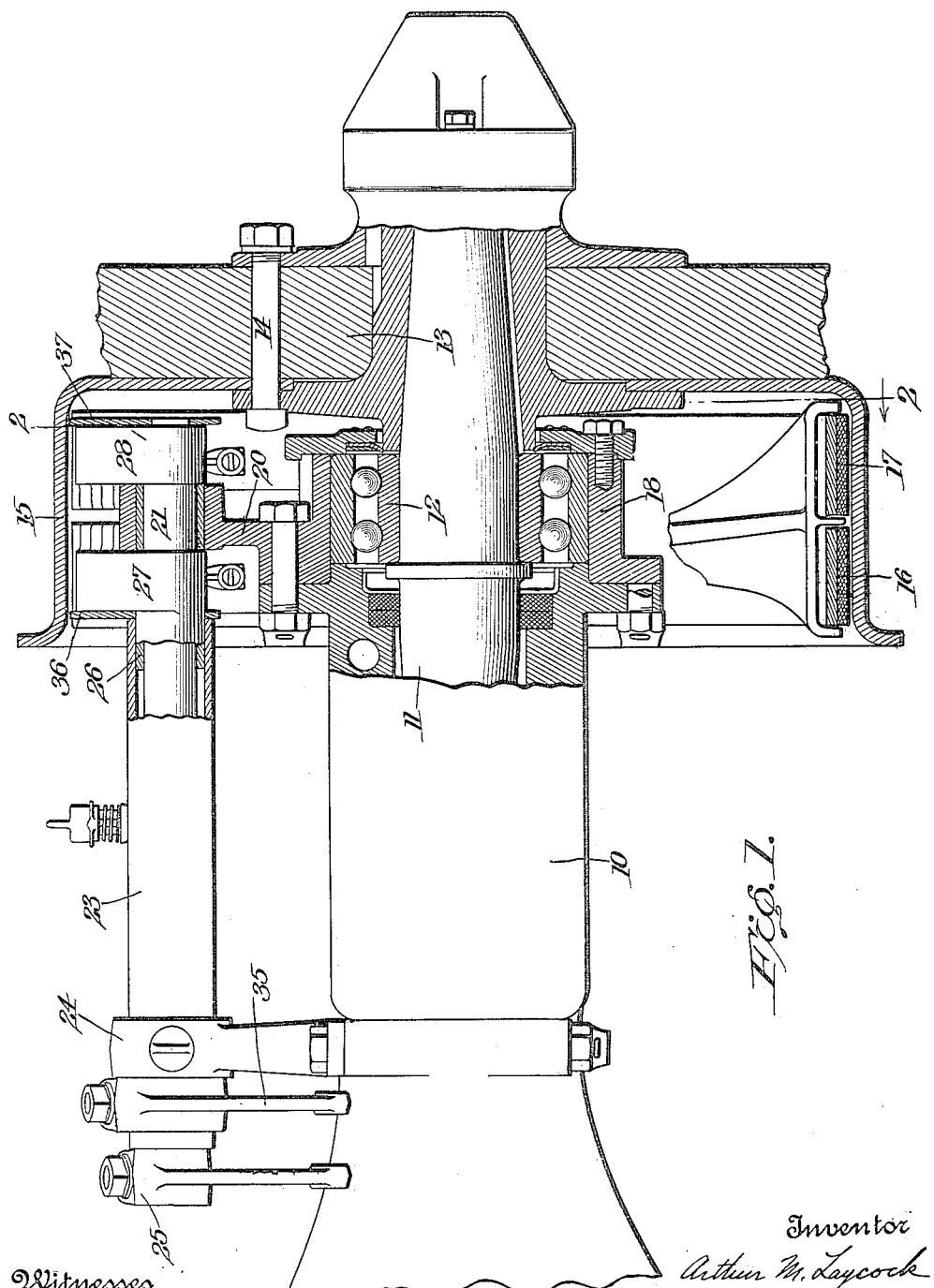
Figure 2:
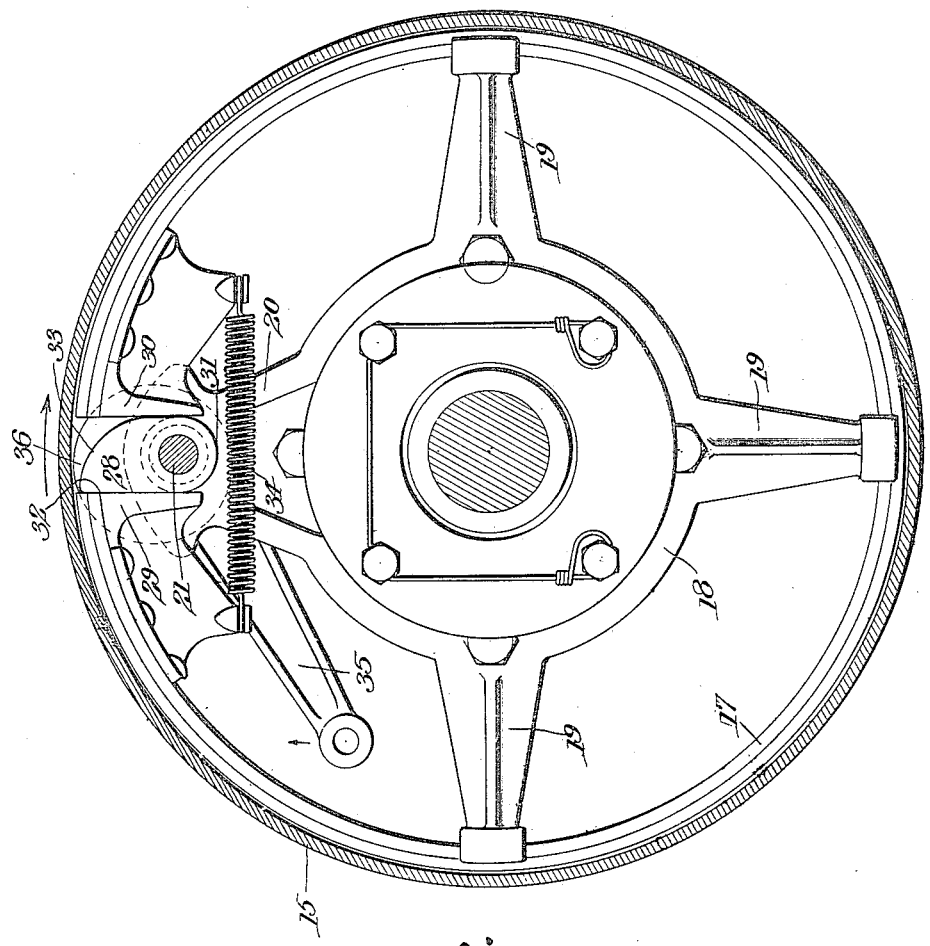

Other objects and the features of novelty will be apparent from the following description taken in connection with the accompanying drawings, in which, Figure 1 is a plan of a portion of a driving axle of a motor vehicle, with parts shown in section, and Fig. 2 is a section on the line 2—2 of Fig. 1.

Referring to the drawings, 10 indicates the axle tube or housing and 11 the driving shaft therein, this shaft being supported in a roller bearing 12 and carrying at its outer end the wheel 13. Secured to the wheel 13 in any suitable manner, as by the bolts 14, is a brake drum 15 with which two brake bands 16 and 17 coöperate. A spider 18 is secured to the end of the housing 10 and provided with the radially projecting arms 19 which loosely support the brake bands 16 and 17 in close proximity to the inner surface of the brake drum 15. The spider 18 is also provided with an arm 20 in which a shaft 21 is pivoted. The shaft 21 has an extension 22 in the tube 23 which has one end supported in a bracket 24 secured to the housing 10. The extension 22 has secured thereon the actuating arm 25 and the tube 23 is rigidly secured at 26 to a cam member 27 for actuating the brake band 16. The shaft 21 carries a cam member 28 for actuating the brake band 17.

The ends of the bands 16 and 17 are slightly spaced apart and provided with the inwardly turned brackets 29 and 30, between which the cams 27 and 28 are arranged. It will be understood that the cams 27 and 28 are similar in form and therefore a description of one of these cams will suffice for both. Referring to Fig. 2 it will be seen that the cam 28 has a semi-cylindrical surface 31, the axis of which coincides with the axis of the shaft 21. The cam 28 also has a plane surface 32 and a curved surface 33 which is eccentric to the axis of the shaft 21. It will be noted that the diameter of the semi-cylindrical surface 31 of the cam is equal to the normal distance between the ends of the brake bands and the brackets 29 and 30 are held against the cams by springs 34.

The direction of forward rotation of the brake drum 15 is indicated by the arrow in Fig. 2 and it will be observed that when it is desired to apply either of the brakes the cams will be rotated toward the right, in Fig. 2, the surface 33 camming the bracket 30 and one end of the brake band against the inner surface of the drum 15. As soon as the end of the band engages with the surface of the brake drum, the brake will progressively apply itself, the opposite end of the band being held in the position shown by the engagement of the bracket 29 with the surface 31, the semi-cylindrical character of this surface holding the bracket 29 immovable. When the brake drum is rotating in the reverse direction, as when the vehicle is moving backward, the action will be the same except that the brake will not have a tendency to apply itself progressively, as above described.

The action of the cam 27 is similar to that described with reference to cam 28 and the cam 27 will be actuated by an arm 35 on the end of the tube 23. In order to hold the ends of the brake bands against lateral displacement, disks 36 and 37 are arranged alongside of the cams and in engagement with the sides of the brackets 29 and 30.

Having thus described the invention, what is claimed and desired to be secured by Letters Patent is:

1. In brake mechanism for motor vehicles, the combination of a brake drum, a brake band loosely supported in said drum and having its ends spaced apart and each formed with a flat surface, a rocking cam arranged between said flat surfaces, said cam having a cylindrical portion and an eccentric portion, the cylindrical portion being engaged by the flat surface on one end of said band to hold the same against circumferential movement only, when the other end is moved against said drum by the said eccentric portion.

2. In brake mechanism for motor vehicles, the combination of a brake drum, a brake band loosely supported in said drum and having its ends spaced apart and each formed with a flat surface, a rocking cam arranged between said flat surfaces, said cam having a semi-cylindrical surface, a plane surface joining one end of the surface of said semi-cylindrical surface, and a curved surface eccentric to the axis of the semi-cylindrical surface and joining the other end of the latter, said semi-cylindrical surface being arranged to be engaged by the flat surface on either end of said band to hold the same against circumferential movement only when said cam is rocked to move the other end of the band against said drum.

In testimony whereof I affix my signature.

ARTHUR M. LAYCOCK.